United States Patent
Nonaka et al.

(10) Patent No.: US 12,454,490 B2
(45) Date of Patent: Oct. 28, 2025

(54) SINTERING METHOD FOR DENTAL ZIRCONIA CALCINED BODY

(71) Applicant: SHOFU INC., Kyoto (JP)

(72) Inventors: Kazumichi Nonaka, Kyoto (JP); Shuhei Takahashi, Kyoto (JP)

(73) Assignee: SHOFU INC., Kyoto (JP)

( * ) Notice: Subject to any disclaimer, the term of this patent is extended or adjusted under 35 U.S.C. 154(b) by 761 days.

(21) Appl. No.: 17/828,656

(22) Filed: May 31, 2022

(65) Prior Publication Data

US 2023/0082975 A1    Mar. 16, 2023

(30) Foreign Application Priority Data

May 31, 2021   (JP) ................. 2021-091133

(51) Int. Cl.
*C04B 35/48*     (2006.01)
*C04B 35/64*     (2006.01)

(52) U.S. Cl.
CPC .............. *C04B 35/48* (2013.01); *C04B 35/64* (2013.01); *C04B 2235/3246* (2013.01); *C04B 2235/6562* (2013.01)

(58) Field of Classification Search
CPC ..... C04B 35/48; C04B 35/64; C04B 2235/3246; C04B 2235/6562; C04B 2235/3217; C04B 2235/3225; C04B 2235/72; C04B 2235/9653; C04B 35/486; C04B 35/622; C04B 2235/9646; C04B 2111/00836; A61C 13/083; A61K 6/818
See application file for complete search history.

(56) References Cited

U.S. PATENT DOCUMENTS

2022/0133601 A1*  5/2022  Jahns .................. C04B 35/4885
                                                    433/203.1

* cited by examiner

*Primary Examiner* — Armand Melendez
(74) *Attorney, Agent, or Firm* — Wenderoth, Lind & Ponack, L.L.P.

(57) ABSTRACT

[Problem]
A technique for improving translucency in order to prepare a zirconia sintered body having high translucency without using special equipment, has been required.
[Solution]
To provide A sintering method for a dental zirconia calcined body containing 5.5 mol % to 7.0 mol % of a stabilizer, wherein the method satisfies the following (a) to (c).
  (a) an average rate of temperature increase in the section from room temperature to 1300° C. is 9° C./min or more.
  (b) an average rate of temperature increase in the section from 1300° C. to 1400° C. is 0.6° C./min or more and 3° C./min or less.
  (c) an average rate of temperature increase in the section from 1400° C. to the maximum temperature of the sintering process is 0.5° C./min or more and 2.5° C./min or less.

16 Claims, No Drawings

SINTERING METHOD FOR DENTAL ZIRCONIA CALCINED BODY

CROSS-REFERENCE TO RELATED APPLICATIONS

This application is based on and claims the benefit of priority from Japanese Patent Application Serial No. 2021-091133 (filed on May 31, 2021), the contents of which are hereby incorporated by reference in their entirety.

BACKGROUND OF THE INVENTION

Field of the Invention

The present disclosure relates to a sintering method for a dental zirconia calcined body.

Description of the Related Art

In recent years, techniques to prepare a prosthesis device by the cutting and machining which uses a dental CAD/CAM system spread rapidly and therefore it has been becoming possible to easily prepare prosthetic devices by cutting and machining the mill blanks which are made of ceramic materials such as a zirconia, an alumina and a lithium disilicate glass, or resin materials such as an acrylic resin and a hybrid resin.

In particular, the zirconia has been clinically applied in various cases because of its high strength. On the other hand, the sintered zirconia which can be used in the oral cavity (hereinafter, referred to as "zirconia sintered body") has a very high hardness, and therefore cannot be cut and machined using a dental CAD/CAM system. Thus, a zirconia which is not final fired but is calcined at a low firing temperature to adjust to a hardness that enables to cut (dental zirconia calcined body) has been used as a zirconia mill blank for dental cutting and machining.

When a zirconia was initially applied as a dental material, the zirconia had high strength but lower translucency than natural tooth, and therefore it was mainly used as a coping or a frame.

In recent years, zirconia with improved translucency (high translucency zirconia) has been developed by increasing the concentration of the stabilizer contained in zirconia and its usages has been expanding from a molar tooth to a full crown of a front tooth.

However, even if using high translucency zirconia, the translucency is insufficient to reproduce an enamel of a natural tooth. Therefore, especially in cases where aesthetic property is required, a restoration having translucency similar to a natural tooth has been prepared by building porcelain on a zirconia.

In this situation, it has been desired to prepare a restoration having translucency more similar to a natural tooth with a full contour zirconia, and therefore, it has been necessary to develop a zirconia having more excellent translucency.

However, even if the concentration of the stabilizer is increased in order to obtain translucency equal to or higher than that of highly translucent zirconia, higher translucency cannot be obtained. It is believed that this is because as the concentration of the stabilizer increases, grain growth of zirconia is accelerated and closed pores tend to increase.

In order to suppress such closed pores, a special manufacturing method such as HIP (hot isostatic pressing) treatment is required. Therefore, in the case of preparing highly translucent zirconia having a higher stabilizer concentration, special equipment such as a HIP apparatus is required.

A dental zirconia prosthetic device has been prepared by cutting and machining a dental zirconia calcined body, sintering the workpiece, and adjusting the workpiece. These operations are mainly performed in dental laboratories. Therefore, special equipment such as HIP equipment is not used as a realistic means because it is necessary to introduce the special equipment into each dental laboratory.

From the viewpoint of preparation efficiency, it has been desired to shorten the time required for sintering zirconia as much as possible. For example, in the case that the business hours of a dental laboratory are 8 hours and the time required for sintering zirconia is 8 hours or less, it is possible to sintering zirconia twice per a day. However, in the case that the time required for sintering zirconia exceeds 8 hours, it is possible to sintering zirconia only one time per a day.

Patent Document 1 discloses a zirconia calcined body prepared by using a zirconia powder containing 3 mol % of yttrium with a reduced alumina content and a zirconia sintered body prepared from the zirconia calcined body. Since the translucency is improved in the sintered body while maintaining high strength, the sintered body is clinically applied in a long span bridge of 4 or more units, a molar part full crown and the like. However, since translucency is insufficient in the sintered body, it has been difficult to apply to the case where high aesthetic property is required such as a front tooth portion.

Patent Document 2 discloses a zirconia perfect sintered body using a zirconia powder containing yttrium of 2 to 7 mol %. Since the sintered body has high translucency similar to a porcelain material or a lithium disilicate material, it is applicable to not only the cases of the front tooth but also the cases such as inlay, onlay and veneer. However, since the hot isostatic pressing (HIP) treatment is essential for the sintered body, it has been difficult to manufacture in the general dental laboratory.

RELEVANT REFERENCES

Patent Literature

[Patent document 1] Japanese Unexamined Patent Application Publication No. 2010-150063
[Patent document 2] Japanese Unexamined Patent Application Publication No. 2008-222450

SUMMARY OF THE INVENTION

Technical Problem

A technique for improving translucency in order to prepare a zirconia sintered body having high translucency without using special equipment, has been required.

Solution to Problem

The present disclosures made a study on a sintering method for a dental zirconia calcined body which may improve translucency in order to impart high translucency which is similar to an enamel of a natural tooth to a zirconia sintered body without using special equipment and may not require long time for sintering.

The sintering method for a dental zirconia calcined body of the present disclosure is a sintering method for a dental zirconia calcined body containing 5.5 mol % to 7.0 mol % of a stabilizer, wherein the method satisfies the following (a) to (c).
(a) an average rate of temperature increase in the section from room temperature to 1300° C. is 9° C./min or more.
(b) an average rate of temperature increase in the section from 1300° C. to 1400° C. is 0.6° C./min or more and 3° C./min or less.
(c) an average rate of temperature increase in the section from 1400° C. to the maximum temperature of the sintering process is 0.5° C./min or more and 2.5° C./min or less.

In the present disclosure, the average rate of temperature increase in the step (a) may be 15° C./min or more and 60° C./min or less.

In the present disclosure, the average rate of temperature increase in the step (b) may be 1° C./min or more and 2° C./min or less.

In the present disclosure, the average rate of temperature increase in the step (c) may be 1° C./min or more and 1.5° C./min or less.

In the present disclosure, the stabilizer may be yttria.

Advantageous Effects of Invention

The sintering method for a dental zirconia calcined body of the present disclosure may prepare a zirconia sintered body having high translucency by improving translucency without using special equipment and without requiring long time for sintering.

DETAILED DESCRIPTION OF THE PREFERRED EMBODIMENTS

The sintering method for a dental zirconia calcined body of the present disclosure is a sintering method for a dental zirconia calcined body containing 5.5 mol % to 7.0 mol % of a stabilizer, and satisfies the following (a) to (c).
(a) an average rate of temperature increase in the section from room temperature to 1300° C. is 9° C./min or more.
(b) an average rate of temperature increase in the section from 1300° C. to 1400° C. is 0.6° C./min or more and 3° C./min or less.
(c) an average rate of temperature increase in the section from 1400° C. to the maximum temperature of the sintering process is 0.5° C./min or more and 2.5° C./min or less.

In the sintering method of the present disclosure, in the step (a), the average rate of temperature increase in the section from room temperature to 1300° C. is 9° C./min or more, and is preferably 15° C./min or more and 60° C./min or less. When the average rate of temperature increase is less than 9° C./min, the time required for the entire sintering process increases and the preparation efficiency decreases. When the average rate of temperature increase is 15° C./min or more, it is possible to reduce the time required for the entire sintering process to 480 minutes or less even when the step (b) and the step (c) are set within the preferable range, and therefore it is particularly preferable. When the average rate of temperature increase exceeds 60° C./min, the sintering furnace may be overloaded or the final temperature in the step (a) may be temporarily exceeded, and therefore it is not preferable.

In the sintering method of the present disclosure, in the step (b), the average rate of temperature increase in the section from 1300° C. to 1400° C. is 0.6° C./min or more and 3° C./min or less, and is preferably 1° C./min or more and 2° C./min or less. When the average rate of temperature increase exceeds 3° C./min, there is a tendency that translucency of the zirconia sintered body decreases. When the average rate of temperature increase is less than 0.6° C./min, the time required for the entire sintering process increases and the preparation efficiency decreases. Since translucency can be improved while shortening the time required for the entire sintering process, 1° C./min or more and 2° C./min or less is preferable. In the dental industry, the average rate of temperature increase of 3° C./min or more and 10° C./min is generally used in many cases.

In the sintering method of the present disclosure, in the step (c), the average rate of temperature increase in the section from 1400° C. to the maximum temperature of the sintering process is 0.5° C./min or more and 2.5° C./min or less, and is preferably 1° C./min or more and 1.5° C./min or less. When the average rate of temperature increase exceeds 2.5° C./min, there is a case that the average rate of temperature increase in the section from 1400° C. to the maximum temperature of the sintering process in the step (c) is higher than the average rate of temperature increase in the section from 1300° C. to 1400° C. in the step (b). In this case, there is a tendency that the translucency of the zirconia sintered body decreases. When the average rate of temperature increase is less than 0.5° C./min, the time required for the entire sintering process increases and the preparation efficiency decreases. Since translucency can be improved while shortening the time required for the entire sintering process, 1° C./min or more and 1.5° C./min or less is preferable. In the dental industry, the average rate of temperature increase of 3° C./min or more and 10° C./min is generally used in many cases.

There is no particular limitation on the type of a stabilizer used in the present disclosure. Examples include yttria, ceria, calcia, and indium oxide, but yttria, which is used in many dental zirconias, is preferable.

The concentration of a stabilizer in the present disclosure is preferably in the range of 5.5 mol % to 7.0 mol %, particularly preferably 6.3 mol % to 6.7 mol % in terms of oxide. When the stabilizer concentration is less than 5.5 mol % or exceeds 7.0 mol %, the effect of the sintering method according to the present disclosure is hardly obtained. In the present disclosure, the remainder other than specified component as the components constituting of the dental zirconia calcined body of the present disclosure can be composed of zirconia ($ZrO_2$). Further, an amount of zirconia ($ZrO_2$) can be within a range of 93 mol % to 94.5 mol % in terms of oxide.

There is no particular limitation on the state of a stabilizer used in the dental zirconia calcined body. Specifically, it may be solid solved in the zirconia, or may exist as a crystal or an amorphous as a compound, which are different from the zirconia.

As a method of adding a stabilizer to the dental zirconia calcined body, a method which can add uniformly a specific amount of a stabilizer to the dental zirconia calcined body is preferable. For example, a method which comprises adding a stabilizer in preparing a zirconia particle may be used, or a method which comprises immersing a dental zirconia calcined body in a solution containing a stabilizer may be used.

When the method of immersing a dental zirconia calcined body in a solution containing a stabilizer is used, any solvents can be used for the solution containing the stabilizer, but specific examples can be used include water, alcohol, an organic solvent and the like. Water, ethanol and a mixture thereof are particularly preferable since it is easily available and is easy to handle.

A method for preparing the solution containing a stabilizer is not particularly limited, and there is no problem at all with any preparation method as long as the stabilizer is dissolved in the solvent.

There is no limitation in a specific atmosphere in which a dental zirconia calcined body is permeated with the solution containing a stabilizer, and there is no problem in a normal pressure atmosphere, a reduced pressure atmosphere and a pressurized atmosphere. From the viewpoint of shortening the preparation time, a reduced pressure atmosphere or a pressurized atmosphere is preferable as the surrounding environment because of promoting the permeation of the solution containing a stabilizer. In addition, it is effective for shortening the time of the step in which the solution containing a stabilizer infiltrates into a space which is in inside of inside of the dental zirconia calcined body and communicates with the outside of the dental zirconia calcined body, that the operation of returning to normal pressure after the pressure reduction operation (pressure reduction/normal pressure operation) or the operation of returning to normal pressure after the pressuring operation (pressuring/normal pressure operation) is repeated multiple times.

The time for immersing the dental zirconia calcined body in the solution containing a stabilizer is not determined unconditionally and can be adjusted appropriately based on the relative density and the molded body size of the dental zirconia calcined body and the degree of infiltration and the method for immersing of the solution containing a stabilizer and the like. For example, the time for immersing is usually 1 to 120 hours in the case of immersing, the time for immersing is usually 0.5 to 12 hours in the case of immersing under reduced pressure, and the time for immersing is usually 0.2 to 6 hours in the case of contacting under pressurization.

It is preferable that the primary particle diameter of a zirconia powder used for preparing the dental zirconia calcined body in the present disclosure is within a range of 1 to 500 nm. When the primary particle diameter is less than 1 nm, there is a tendency that it is difficult to impart sufficient strength, although the translucency of the zirconia sintered body is improved. On the other hand, when the primary particle diameter is 500 nm or more, there is a tendency that it is difficult to impart sufficient strength to the zirconia sintered body.

It is preferable that the dental zirconia calcined body of the present disclosure contains a colorant. Specific examples thereof include an inorganic colorant. More specific examples thereof include iron oxide, erbium, cobalt, manganese, chromium, and rare earth elements. Iron oxide may be added for imparting a yellow color and erbium may be added for imparting a red color. In addition to these colorants, it is preferable that the element such as cobalt, manganese and chromium is used in combination for a color tone adjustment. In the present disclosure, it is preferable to color the tooth color by including the colorant.

The dental zirconia calcined body of the present disclosure may contain a sintering aid. Specifically, for the purpose of improving the sinterability and suppressing low temperature deterioration, it is preferable to contain 0.01 to 0.3 wt. % of alumina. When the amount of alumina is less than 0.01 wt. %, there is a tendency that it may be difficult to obtain sufficient characteristics even after final firing and therefore sufficient strength and translucency may be not imparted. On the other hand, when the amount of alumina exceeds 0.3 wt. %, there is a tendency that it may be difficult to impart sufficient translucency although strength of the zirconia sintered body is improved.

It is preferable that the relative density of the zirconia sintered body prepared by firing the dental zirconia calcined body in the present disclosure at within a range of 1450° C. to 1600° C. is 98% or more of the theoretical density. The relative density is determined by the measured density/the theoretical density. When the relative density is less than 98%, the strength and translucency tend to be lowered.

It is preferable that a crystal phase of the dental zirconia calcined body in the present disclosure is tetragonal and/or cubic. When the crystal phase is monoclinic phase, it is not preferable because sufficient translucency may be not imparted even after final firing.

A preparing method of the dental zirconia calcined body in the present disclosure is not particularly limited, and any known preparing methods can be used without any problem. Specifically, it is preferable to be prepared by molding a zirconia powder by press molding. Furthermore, it is more preferable to be prepared by a multilayer molding in which zirconia powders having different color tones or compositions are press-molded in multiple stages.

The dental zirconia calcined body in the present disclosure is preferably subjected to isostatic pressing by cold isostatic pressing (CIP treatment) after the press molding.

The maximum load pressure of CIP treatment in the present disclosure is preferably 50 Mpa or more. When the maximum load pressure is less than 50 MPa, there is a case where sufficient translucency and strength may not bet imparted to the zirconia sintered body.

A calcination temperature of the dental zirconia calcined body in the present disclosure is preferably within a range of 800 to 1200° C. When the calcination temperature is less than 800° C., because Vickers hardness and/or bending strength become too low and therefore there is a tendency that chipping and breakage easily occur in the cutting and machining. On the other hand, when the calcination temperature is more than 1200° C., because Vickers hardness and/or bending strength become too high and therefore there is a tendency that a milling bar of a milling machine is heavily consumed to raise a running cost.

In this way, a zirconia sintered body can be prepared by the preparing method of the present disclosure. The prepared zirconia sintered body is shape corrected, color tone adjusted and surface polished as necessary.

The kind of a prosthesis device prepared by using the preparing method according to the present disclosure is not limited particularly, and there is no problem at all even if the prosthesis device is any of an inlay, an onlay, a veneer, a crown, a bridge and the like. Therefore, a shape of a dental zirconia calcined body which is cut and machined for preparing a prosthesis device is not limited particularly, and any dental zirconia calcined body can be used even if the dental zirconia calcined body has any shape such as a block shape corresponding to an inlay, an onlay, a veneer, a crown and the like and a disk shape corresponding to a bridge.

EXAMPLES

Hereinafter, the present disclosure is described by way of Examples in more detail, and specifically, but the present disclosure is not limited to these Examples.

[Preparation of Zirconia Mill Blank (Dental Zirconia Calcined Body)]
(Mill Blank 1)
Zirconia powder containing 6.5 mol % of solid-solved yttria (containing 0.05 wt. % of alumina) was filled in a mold (φ100 mm), and press molding (surface pressure: 50 MPa) was performed to obtain a molded body. Further, the molded body was subjected to CIP treatment (maximum load pressure: 200 MPa, load pressure after releasing: 0 MPa, holding time: 1 minute). Thereafter, calcination was performed in an electric furnace (1000° C., 30 minutes) to prepare a zirconia mill blank.
(Mill Blank 2)
A zirconia mill blank was prepared in the same manner as the Mill blank 1 except that zirconia powder containing 5.5 mol % of solid solved yttria (containing 0.05 wt. % of alumina) was used.
(Mill Blank 3)
A zirconia mill blank was prepared in the same manner as the Mill blank 1 except that zirconia powder containing 7.0 mol % of solid solved yttria (containing 0.05 wt. % of alumina) was used.
(Mill Blank 4)
A zirconia mill blank was prepared in the same manner as the Mill blank 1 except that zirconia powder containing 6.0 mol % of solid solved yttria (containing 0.05 wt. % of alumina) was used.
(Mill Blank 5)
A zirconia mill blank was prepared in the same manner as the Mill blank 1 except that zirconia powder containing 6.3 mol % of solid solved yttria (containing 0.05 wt. % of alumina) was used.
(Mill Blank 6)
A zirconia mill blank was prepared in the same manner as the Mill blank 1 except that zirconia powder containing 6.7 mol % of solid solved yttria (containing 0.05 wt. % of alumina) was used.
(Mill Blank 7)
A zirconia mill blank was prepared in the same manner as the Mill blank 1 except that zirconia powder containing 5.0 mol % of solid solved yttria (containing 0.05 wt. % of alumina) was used.

A zirconia mill blank was prepared in the same manner as the Mill blank 1 except that zirconia powder containing 7.5 mol % of solid solved yttria (containing 0.05 wt. % of alumina) was used.

[Measurement of Yttria Content (Mol %)]
The test specimen for evaluating the content of yttria was prepared by cutting and machining each zirconia mill blank into a round plate shape (φ14 mm×1.6 mm). The amount of yttria on each of the upper surface and the lower surface of each test specimen was measured by using a fluorescent X-ray analysis device (manufactured by Rigaku Corporation), and the average value of each of the upper surface and the lower surface was defined as the yttria content. Further, the yttrium contents (mol %) are shown in terms of oxide.

[Sintering Condition]
The zirconia mill blank was cut and machined respectively into a predetermined shape, and fired according to the sintering schedule shown in Tables 1 to 4 to prepare a zirconia sintered body.

TABLE 1

| | Time(min) | Rate of temperature increase(° C. min) | Average rate of temperature increase | | |
|---|---|---|---|---|---|
| Sintering schedule 6 | | | | | |
| 25° C. to 1300° C. | 25.5 | 50 | to 1300° C. | 1300° C. to 1400° C. | 1400° C. to |
| 1300° C. to 1330° C. | 7.5 | 4 | 50 | 3.2 | 2.6 |
| 1330° C. to 1400° C. | 23.3 | 3 | | | |
| 1400° C. to 1500° C. | 33.3 | 3 | | | |
| 1500° C. to 1550° C. | 25 | 2 | | | |
| 1550° C. Holding | 60 | — | | | |
| 1550° C. to Room temperature | 180 | Furnace cooling | Required time(min) 354.7 | | |
| Sintering schedule 7 | | | | | |
| 25° C. to 1300° C. | 25.5 | 50 | to 1300° C. | 1300° C. to 1400° C. | 1400° C. to |
| 1300° C. to 1330° C. | 7.5 | 4 | 50 | 3.2 | 1.0 |
| 1330° C. to 1400° C. | 23.3 | 3 | | | |
| 1400° C. to 1550° C. | 150 | 1 | | | |
| 1550° C. Holding | 60 | — | | | |
| 1550° C. to Room temperature | 180 | Furnace cooling | Required time(min) 446.3 | | |
| Sintering schedule 8 | | | | | |
| 25° C. to 1300° C. | 25.5 | 50 | to 1300° C. | 1300° C. to 1400° C. | 1400° C. to |
| 1300° C. to 1400° C. | 50 | 2 | 50 | 2.0 | 2.6 |
| 1400° C. to 1500° C. | 33 | 3 | | | |
| 1500° C. to 1550° C. | 25 | 2 | | | |
| 1550° C. Holding | 60 | — | | | |
| 1550° C. to Room temperature | 180 | Furnace cooling | Required time(min) 373.8 | | |
| Sintering schedule 9 | | | | | |
| 25° C. to 1300° C. | 255 | 5 | to 1300° C. | 1300° C. to 1400° C. | 1400° C. to |
| 1300° C. to 1400° C. | 20 | 5 | 5.0 | 5.0 | 5.0 |
| 1400° C. to 1550° C. | 30 | 5 | | | |
| 1550° C. Holding | 60 | — | | | |
| 1550° C. to Room temperature | 180 | Furnace cooling | Required time(min) 545.0 | | |

TABLE 1-continued

|  | Time(min) | Rate of temperature increase(° C. min) | Average rate of temperature increase | | |
|---|---|---|---|---|---|
| Sintering schedule 10 | | | | | |
| 25° C. to 1300° C. | 25.5 | 50 | to 1300° C. 50 | 1300° C. to 1400° C. 2.0 | 1400° C. to 1.5 |
| 1300° C. to 1400° C. | 50 | 2 | | | |
| 1400° C. to 1500° C. | 50 | 2 | | | |
| 1500° C. to 1550° C. | 50 | 1 | | | |
| 1550° C. Holding | 60 | — | | | |
| 1550° C. to Room temperature | 180 | Furnace cooling | Required time(min) 415.5 | | |

TABLE 2

|  | Time(min) | Rate of temperature increase(° C. min) | Average rate of temperature increase | | |
|---|---|---|---|---|---|
| Sintering schedule 6 | | | | | |
| 25° C. to 1300° C. | 25.5 | 50 | to 1300° C. 50 | 1300° C. to 1400° C. 3.2 | 1400° C. to 2.6 |
| 1300° C. to 1330° C. | 7.5 | 4 | | | |
| 1330° C. to 1400° C. | 23.3 | 3 | | | |
| 1400° C. to 1500° C. | 33.3 | 3 | | | |
| 1500° C. to 1550° C. | 25 | 2 | | | |
| 1550° C. Holding | 60 | — | | | |
| 1550° C. to Room temperature | 180 | Furnace cooling | Required time(min) 354.7 | | |
| Sintering schedule 7 | | | | | |
| 25° C. to 1300° C. | 25.5 | 50 | to 1300° C. 50 | 1300° C. to 1400° C. 3.2 | 1400° C. to 1.0 |
| 1300° C. to 1330° C. | 7.5 | 4 | | | |
| 1330° C. to 1400° C. | 23.3 | 3 | | | |
| 1400° C. to 1550° C. | 150 | 1 | | | |
| 1550° C. Holding | 60 | — | | | |
| 1550° C. to Room temperature | 180 | Furnace cooling | Required time(min) 446.3 | | |
| Sintering schedule 8 | | | | | |
| 25° C. to 1300° C. | 25.5 | 50 | to 1300° C. 50 | 1300° C. to 1400° C. 2.0 | 1400° C. to 2.6 |
| 1300° C. to 1400° C. | 50 | 2 | | | |
| 1400° C. to 1500° C. | 33 | 3 | | | |
| 1500° C. to 1550° C. | 25 | 2 | | | |
| 1550° C. Holding | 60 | — | | | |
| 1550° C. to Room temperature | 180 | Furnace cooling | Required time(min) 373.8 | | |
| Sintering schedule 9 | | | | | |
| 25° C. to 1300° C. | 255 | 5 | to 1300° C. 5.0 | 1300° C. to 1400° C. 5.0 | 1400° C. to 5.0 |
| 1300° C. to 1400° C. | 20 | 5 | | | |
| 1400° C. to 1550° C. | 30 | 5 | | | |
| 1550° C. Holding | 60 | — | | | |
| 1550° C. to Room temperature | 180 | Furnace cooling | Required time(min) 545.0 | | |
| Sintering schedule 10 | | | | | |
| 25° C. to 1300° C. | 25.5 | 50 | to 1300° C. 50 | 1300° C. to 1400° C. 2.0 | 1400° C. to 1.5 |
| 1300° C. to 1400° C. | 50 | 2 | | | |
| 1400° C. to 1500° C. | 50 | 2 | | | |
| 1500° C. to 1550° C. | 50 | 1 | | | |
| 1550° C. Holding | 60 | — | | | |
| 1550° C. to Room temperature | 180 | Furnace cooling | Required time(min) 415.5 | | |

TABLE 3

|  | Time(min) | Rate of temperature increase(° C. min) | Average rate of temperature increase | | |
|---|---|---|---|---|---|
| Sintering schedule 11 | | | | | |
| 25° C. to 1300° C. | 25.5 | 50 | to 1300° C. 50 | 1300° C. to 1400° C. 2.0 | 1400° C. to 2.5 |
| 1300° C. to 1400° C. | 50 | 2 | | | |
| 1400° C. to 1490° C. | 30 | 3 | | | |
| 1490° C. to 1550° C. | 30 | 2 | | | |
| 1550° C. Holding | 60 | — | | | |
| 1550° C. to Room temperature | 180 | Furnace cooling | Required time(min) 375.5 | | |
| Sintering schedule 12 | | | | | |
| 25° C. to 1300° C. | 638 | 2 | to 1300° C. 2.0 | 1300° C. to 1400° C. 2.0 | 1400° C. to 2.0 |
| 1300° C. to 1400° C. | 50 | 2 | | | |

TABLE 3-continued

|  | Time(min) | Rate of temperature increase(° C. min) | Average rate of temperature increase | | |
|---|---|---|---|---|---|
| 1400° C. to 1550° C. | 75 | 2 | | | |
| 1550° C. Holding | 60 | — | | | |
| 1550° C. to Room temperature | 180 | Furnace cooling | Required time(min) 1002.5 | | |
| Sintering schedule 13 | | | | | |
| 25° C. to 1300° C. | 141.7 | 9 | to 1300° C. | 1300° C. to 1400° C. | 1400° C. to |
| 1300° C. to 1400° C. | 33.3 | 3 | 9.0 | 3.0 | 2.5 |
| 1400° C. to 1490° C. | 30 | 3 | | | |
| 1490° C. to 1550° C. | 30 | 2 | | | |
| 1550° C. Holding | 60 | — | | | |
| 1550° C. to Room temperature | 180 | Furnace cooling | Required time(min) 475.0 | | |
| Sintering schedule 14 | | | | | |
| 25° C. to 1300° C. | 159.4 | 8 | to 1300° C. | 1300° C. to 1400° C. | 1400° C. to |
| 1300° C. to 1400° C. | 33.3 | 3 | 8.0 | 3.0 | 2.5 |
| 1400° C. to 1490° C. | 30 | 3 | | | |
| 1490° C. to 1550° C. | 30 | 2 | | | |
| 1550° C. Holding | 60 | — | | | |
| 1550° C. to Room temperature | 180 | Furnace cooling | Required time(min) 492.7 | | |
| Sintering schedule 15 | | | | | |
| 25° C. to 1300° C. | 25.5 | 50 | to 1300° C. | 1300° C. to 1400° C. | 1400° C. to |
| 1300° C. to 1400° C. | 50 | 2 | 50 | 2.0 | 1.3 |
| 1400° C. to 1500° C. | 50 | 2 | | | |
| 1500° C. to 1600° C. | 100 | 1 | | | |
| 1600° C. Holding | 60 | — | | | |
| 1600° C. to Room temperature | 180 | Furnace cooling | Required time(min) 465.5 | | |

TABLE 4

|  | Time(min) | Rate of temperature increase(° C. min) | Average rate of temperature increase | | |
|---|---|---|---|---|---|
| Sintering schedule 16 | | | | | |
| 25° C. to 1300° C. | 25.5 | 50 | to 1300° C. | 1300° C. to 1400° C. | 1400° C. to |
| 1300° C. to 1400° C. | 50 | 2 | 50 | 2.0 | 1.0 |
| 1400° C. to 1450° C. | 50 | 1 | | | |
| 1450° C. Holding | 60 | — | | | |
| 1450° C. to Room temperature | 180 | Furnace cooling | Required time(min) 365.5 | | |
| Sintering schedule 17 | | | | | |
| 25° C. to 1300° C. | 255 | 5 | to 1300° C. | 1300° C. to 1400° C. | 1400° C. to |
| 1300° C. to 1400° C. | 20 | 5 | 5.0 | 5.0 | 5.0 |
| 1400° C. to 1600° C. | 40 | 5 | | | |
| 1600° C. Holding | 60 | — | | | |
| 1600° C. to Room temperature | 180 | Furnace cooling | Required time(min) 555.0 | | |
| Sintering schedule 18 | | | | | |
| 25° C. to 1300° C. | 255 | 5 | to 1300° C. | 1300° C. to 1400° C. | 1400° C. to |
| 1300° C. to 1400° C. | 20 | 5 | 5.0 | 5.0 | 5.0 |
| 1400° C. to 1450° C. | 10 | 5 | | | |
| 1450° C. Holding | 60 | — | | | |
| 1450° C. to Room temperature | 180 | Furnace cooling | Required time(min) 525.0 | | |
| Sintering schedule 19 | | | | | |
| 25° C. to 1300° C. | 85 | 15 | to 1300° C. | 1300° C. to 1400° C. | 1400° C. to |
| 1300° C. to 1400° C. | 50 | 2 | 15 | 2.0 | 1.5 |
| 1400° C. to 1500° C. | 50 | 2 | | | |
| 1500° C. to 1550° C. | 50 | 1 | | | |
| 1550° C. Holding | 60 | — | | | |
| 1550° C. to Room temperature | 180 | Furnace cooling | Required time(min) 475 | | |
| Sintering schedule 20 | | | | | |
| 25° C. to 1300° C. | 25.5 | 50 | to 1300° C. | 1300° C. to 1400° C. | 1400° C. to |
| 1300° C. to 1400° C. | 100 | 1 | 50 | 1.0 | 1.6 |
| 1400° C. to 1510° C. | 55 | 2 | | | |
| 1510° C. to 1550° C. | 40 | 1 | | | |
| 1550° C. Holding | 60 | — | | | |
| 1550° C. to Room temperature | 180 | Furnace cooling | Required time(min) 460.5 | | |

[Evaluation of Translucency]

The test specimen for evaluating the translucency was prepared by cutting and machining the zirconia mill blank for dental cutting and machining into a round plate shape (φ14 mm×1.6 mm). Each test specimen was sintered in a firing furnace. Then, each test specimen was adjusted to have the thickness (1.0 mm) with a surface grinder. The translucency was evaluated by measuring the contrast ratio. The contrast ratio was measured by using a spectrocolorimeter (manufactured by Konica Minolta). In the following formula, Yw is the value Y measured by placing the white plate behind the test specimen, and Yb is the value Y measured by placing the black plate behind the test specimen. The contrast ratio was calculated from the following formula. When the contrast ratio value is close to zero, the materials are seen as transparency. When the contrast ratio value is close to 1, the materials are seen as opaqueness.

The contrast ratio=$Yb/Yw$     Formula:

Furthermore, using the same dental zirconia calcined body, the degree of translucency improvement for each sintering schedule was calculated.

Degree of translucency improvement=(contrast ratio of specimen sintered according to sintering schedule 9)/(contrast ratio of specimen sintered according to any of sintering schedules 1 to 19)

When the degree of translucency improvement was 1.15 or more, it was determined that the sintering schedule has particularly high translucency improvement performance.

When the degree of translucency improvement was 1.10 or more and less than 1.15, it was determined that the sintering schedule has high translucency improvement performance.

When the degree of translucency improvement was 1.05 or more and less than 1.10, it was determined that the sintering schedule has slightly high translucency improvement performance.

When the degree of translucency improvement was less than 1.05, it was determined that the sintering schedule has low or no translucency enhancement performance.

It was judged that the effect of the present disclosure was recognized when the degree of translucency improvement was 1.05 or more.

Example 1: A test piece prepared from the mill blank 1 was sintered according to the sintering schedule 1.

Example 2: A test piece prepared from the mill blank 1 was sintered according to the sintering schedule 2.

Example 3: A test piece prepared from the mill blank 1 was sintered according to the sintering schedule 3.

Example 4: A test piece prepared from the mill blank 1 was sintered according to the sintering schedule 4.

Example 5: A test piece prepared from the mill blank 1 was sintered according to the sintering schedule 5.

Example 6: A test piece prepared from the mill blank 2 was sintered according to the sintering schedule 1.

Example 7: A test piece prepared from the mill blank 3 was sintered according to the sintering schedule 1.

Example 8: A test piece prepared from the mill blank 4 was sintered according to the sintering schedule 1.

Example 9: A test piece prepared from the mill blank 5 was sintered according to the sintering schedule 1.

Example 10: A test piece prepared from the mill blank 6 was sintered according to the sintering schedule 1.

Example 11: A test piece prepared from the mill blank 1 was sintered according to the sintering schedule 10.

Example 12: A test piece prepared from the mill blank 1 was sintered according to the sintering schedule 11.

Example 13: A test piece prepared from the mill blank 1 was sintered according to the sintering schedule 13.

Example 14: A test piece prepared from the mill blank 1 was sintered according to the sintering schedule 15.

Example 15: A test piece prepared from the mill blank 1 was sintered according to the sintering schedule 16.

Example 16: A test piece prepared from the mill blank 1 was sintered according to the sintering schedule 19.

Example 17: A test piece prepared from the mill blank 1 was sintered according to the sintering schedule 20.

Comparative Example 1: A test piece prepared from the mill blank 1 was sintered according to the sintering schedule 9.

Comparative Example 2: A test piece prepared from the mill blank 1 was sintered according to the sintering schedule G.

Comparative Example 3: A test piece prepared from the mill blank 1 was sintered according to the sintering schedule 7.

Comparative Example 4: A test piece prepared from the mill blank 1 was sintered according to the sintering schedule 8.

Comparative Example 5: A test piece prepared from the mill blank 2 was sintered according to the sintering schedule 9.

Comparative Example 6: A test piece prepared from the mill blank 3 was sintered according to the sintering schedule 9.

Comparative Example 7: A test piece prepared from the mill blank 7 was sintered according to the sintering schedule 1.

Comparative Example 8: A test piece prepared from the mill blank 8 was sintered according to the sintering schedule 1.

Comparative Example 9: A test piece prepared from the mill blank 7 was sintered according to the sintering schedule 9.

Comparative Example 10: A test piece prepared from the mill blank 8 was sintered according to the sintering schedule 9.

Comparative Example 11: A test piece prepared from the mill blank 4 was sintered according to the sintering schedule 9.

Comparative Example 12: A test piece prepared from the mill blank 5 was sintered according to the sintering schedule 9.

Comparative Example 13: A test piece prepared from the mill blank 6 was sintered according to the sintering schedule 9.

Comparative Example 14: A test piece prepared from the mill blank 1 was sintered according to the sintering schedule 12.

Comparative Example 15: A test piece prepared from the mill blank 1 was sintered according to the sintering schedule 14.

Comparative Example 16: A test piece prepared from the mill blank 1 was sintered according to the sintering schedule 17.

Comparative Example 17: A test piece prepared from the mill blank 1 was sintered according to the sintering schedule 18.

Tables 5 and 6 show the characteristic test results of the prepared dental zirconia calcined body in Examples and Comparative Examples.

TABLE 5

|  | Example 1 | Example 2 | Example 3 | Example 4 | Example 5 |
|---|---|---|---|---|---|
|  | Mill blank 1 | Mill blank 1 | Mill blank 1 | Mill blank 1 | Mill blank 1 |
| Yttria content (mol %) | 6.5 | 6.5 | 6.5 | 6.5 | 6.5 |
| Sintering schedule | Sintering schedule 1 | Sintering schedule 2 | Sintering schedule 3 | Sintering schedule 4 | Sintering schedule 5 |
| Required time for sintering (min) | 466 | 449 | 411 | 461 | 406 |
| Contrast ratio | 0.54 | 0.57 | 0.56 | 0.56 | 0.59 |
| Degree of translucency improvement | 1.19 | 1.12 | 1.14 | 1.14 | 1.08 |

|  | Example 6 | Example 7 | Example 8 | Example 9 | Example 10 |
|---|---|---|---|---|---|
|  | Mill blank 2 | Mill blank 3 | Mill blank 4 | Mill blank 5 | Mill blank 6 |
| Yttria content (mol %) | 5.5 | 7.0 | 6.0 | 6.3 | 6.7 |
| Sintering schedule | Sintering schedule 1 | Sintering schedule 1 | Sintering schedule 1 | Sintering schedule 1 | Sintering schedule 1 |
| Required time for sintering (min) | 466 | 466 | 466 | 466 | 466 |
| Contrast ratio | 0.66 | 0.67 | 0.64 | 0.56 | 0.58 |
| Degree of translucency improvement | 1.05 | 1.07 | 1.05 | 1.16 | 1.16 |

|  | Example 11 | Example 12 | Example 13 | Example 14 | Example 15 |
|---|---|---|---|---|---|
|  | Mill blank 1 | Mill blank 1 | Mill blank 1 | Mill blank 1 | Mill blank 1 |
| Yttria content (mol %) | 6.5 | 6.5 | 6.5 | 6.5 | 6.5 |
| Sintering schedule | Sintering schedule 10 | Sintering schedule 11 | Sintering schedule 13 | Sintering schedule 15 | Sintering schedule 16 |
| Required time for sintering (min) | 416 | 376 | 475 | 466 | 366 |
| Contrast ratio | 0.55 | 0.61 | 0.61 | 0.51 | 0.61 |
| Degree of translucency improvement | 1.16 | 1.05 | 1.05 | 1.25 | 1.05 |

|  | Example 16 | Example 17 |
|---|---|---|
|  | Mill blank 1 | Mill blank 1 |
| Yttria content (mol %) | 6.5 | 6.5 |
| Sintering schedule | Sintering schedule 19 | Sintering schedule 20 |
| Required time for sintering (min) | 475 | 461 |
| Contrast ratio | 0.55 | 0.59 |
| Degree of translucency improvement | 1.16 | 1.08 |

TABLE 6

|  | Comparative Example 1 | Comparative Example 2 | Comparative Example 3 | Comparative Example 4 | Comparative Example 5 | Comparative Example 6 |
|---|---|---|---|---|---|---|
|  | Mill blank 1 | Mill blank 1 | Mill blank 1 | Mill blank 1 | Mill blank 2 | Mill blank 3 |
| Yttria content (mol %) | 6.5 | 6.5 | 6.5 | 6.5 | 5.5 | 7.0 |
| Sintering schedule | Sintering schedule 9 | Sintering schedule 6 | Sintering schedule 7 | Sintering schedule 8 | Sintering schedule 9 | Sintering schedule 9 |
| Required time for sintering (min) | 545 | 355 | 446 | 374 | 545 | 545 |
| Contrast ratio | 0.64 | 0.63 | 0.62 | 0.62 | 0.69 | 0.72 |
| Degree of translucency improvement | — | 1.02 | 1.03 | 1.03 | — | — |

|  | Comparative Example 7 | Comparative Example 8 | Comparative Example 9 | Comparative Example 10 | Comparative Example 11 | Comparative Example 12 |
|---|---|---|---|---|---|---|
|  | Mill blank 7 | Mill blank 8 | Mill blank 7 | Mill blank 8 | Mill blank 4 | Mill blank 5 |
| Yttria content (mol %) | 5.0 | 7.5 | 5.0 | 7.5 | 6.0 | 6.3 |

TABLE 6-continued

| Sintering schedule | Sintering schedule 1 | Sintering schedule 1 | Sintering schedule 9 | Sintering schedule 9 | Sintering schedule 9 | Sintering schedule 9 |
|---|---|---|---|---|---|---|
| Required time for sintering (min) | 466 | 466 | 545 | 545 | 545 | 545 |
| Contrast ratio | 0.7 | 0.89 | 0.7 | 0.9 | 0.67 | 0.65 |
| Degree of translucency improvement | 1 | 1.01 | — | — | — | — |

|  | Comparative Example 13 | Comparative Example 14 | Comparative Example 15 | Comparative Example 16 | Comparative Example 17 |
|---|---|---|---|---|---|
|  | Sintering schedule 6 | Mill blank 1 | Mill blank 1 | Mill blank 1 | Mill blank 1 |
| Yttria content (mol %) | 6.7 | 6.5 | 6.5 | 6.5 | 6.5 |
| Sintering schedule | Sintering schedule 9 | Sintering schedule 12 | Sintering schedule 14 | Sintering schedule 17 | Sintering schedule 18 |
| Required time for sintering (min) | 545 | 1003 | 493 | 555 | 525 |
| Contrast ratio | 0.67 | 0.56 | 0.61 | 0.61 | 0.68 |
| Degree of translucency improvement | — | 1.14 | 1.05 | 1.05 | 0.94 |

In Examples 1 to 17, the dental zirconia calcined body containing 5.5 mol % to 7.0 mol % of a stabilizer satisfied
(a) an average rate of temperature increase in the section from room temperature to 1300° C. is 9° C./min or more.
(b) an average rate of temperature increase in the section from 1300° C. to 1400° C. is 0.6° C./min or more and 3° C./min or less.
(c) an average rate of temperature increase in the section from 1400° C. to the maximum temperature of the sintering process is 0.5° C./min or more and 2.5° C./min or less. Therefore, the translucency was highly improved, and the time required for sintering was within 8 hours.

In Comparative Examples 1 to 17, since the one or more conditions were not satisfied, there was no or little improvement in translucency and/or the time required for sintering exceeded 8 hours.

With respect to the use of substantially any plural and/or singular terms herein, those having skill in the art can translate from the plural to the singular and/or from the singular to the plural as is appropriate to the context.

Although the description herein has been given with reference to the drawings and embodiments, it should be noted that those skilled in the art may make various changes and modifications on the basis of this invention without difficulty. Accordingly, any such changes and modifications are intended to be included in the scope of the embodiments.

INDUSTRIAL APPLICABILITY

The present disclosure relates to a sintering method for a dental zirconia calcined body, and is a technology that can be used in the dental field.

What is claimed is:

1. A sintering method for a dental zirconia calcined body containing 5.5 mol % to 7.0 mol % of a stabilizer, wherein the method satisfies the following (a) to (c),
    (a) an average rate of temperature increase in the section from room temperature to 1300° C. is 9° C./min or more,
    (b) an average rate of temperature increase in the section from 1300° C. to 1400° C. is 0.6° C./min or more and 3° C./min or less,
    (c) an average rate of temperature increase in the section from 1400° C. to the maximum temperature of the sintering process is 0.5° C./min or more and 2.5° C./min or less.

2. The sintering method for a dental zirconia calcined body according to claim 1, wherein
    the average rate of temperature increase in the step (a) is 15° C./min or more and 60° C./min or less.

3. The sintering method for a dental zirconia calcined body according to claim 1, wherein
    the average rate of temperature increase in the step (b) is 1° C./min or more and 2° C./min or less.

4. The sintering method for a dental zirconia calcined body according to claim 2, wherein
    the average rate of temperature increase in the step (b) is 1° C./min or more and 2° C./min or less.

5. The sintering method for a dental zirconia calcined body according to claim 1, wherein
    the average rate of temperature increase in the step (c) is 1° C./min or more and 1.5° C./min or less.

6. The sintering method for a dental zirconia calcined body according to claim 2, wherein
    the average rate of temperature increase in the step (c) is 1° C./min or more and 1.5° C./min or less.

7. The sintering method for a dental zirconia calcined body according to claim 3, wherein
    the average rate of temperature increase in the step (c) is 1° C./min or more and 1.5° C./min or less.

8. The sintering method for a dental zirconia calcined body according to claim 4, wherein
    the average rate of temperature increase in the step (c) is 1° C./min or more and 1.5° C./min or less.

9. The sintering method for a dental zirconia calcined body according to claim 1, wherein
    the stabilizer is yttria.

10. The sintering method for a dental zirconia calcined body according to claim 2, wherein
    the stabilizer is yttria.

11. The sintering method for a dental zirconia calcined body according to claim 3, wherein
    the stabilizer is yttria.

12. The sintering method for a dental zirconia calcined body according to claim 4, wherein
    the stabilizer is yttria.

13. The sintering method for a dental zirconia calcined body according to claim 5, wherein
the stabilizer is yttria.

14. The sintering method for a dental zirconia calcined body according to claim 6, wherein
the stabilizer is yttria.

15. The sintering method for a dental zirconia calcined body according to claim 7, wherein
the stabilizer is yttria.

16. The sintering method for a dental zirconia calcined body according to claim 8, wherein
the stabilizer is yttria.

* * * * *